UNITED STATES PATENT OFFICE.

ALMOND H. SNYDER, OF LANCASTER, NEW YORK, ASSIGNOR TO GOULD STORAGE BATTERY COMPANY, A CORPORATION OF NEW YORK.

STORAGE BATTERY.

1,363,686.  Specification of Letters Patent.  Patented Dec. 28, 1920.

Application filed February 17, 1920, Serial No. 359,389. Renewed October 4, 1920. Serial No. 414,651.

*To all whom it may concern:*

Be it known that I, ALMOND H. SNYDER, a citizen of the United States, and a resident of Lancaster, New York, have invented new and useful Improvements in Storage Batteries, of which the following is a specification.

My invention relates to storage batteries and particularly to means for supporting free ends of plates and also means for supporting separators in place.

Figure 1:
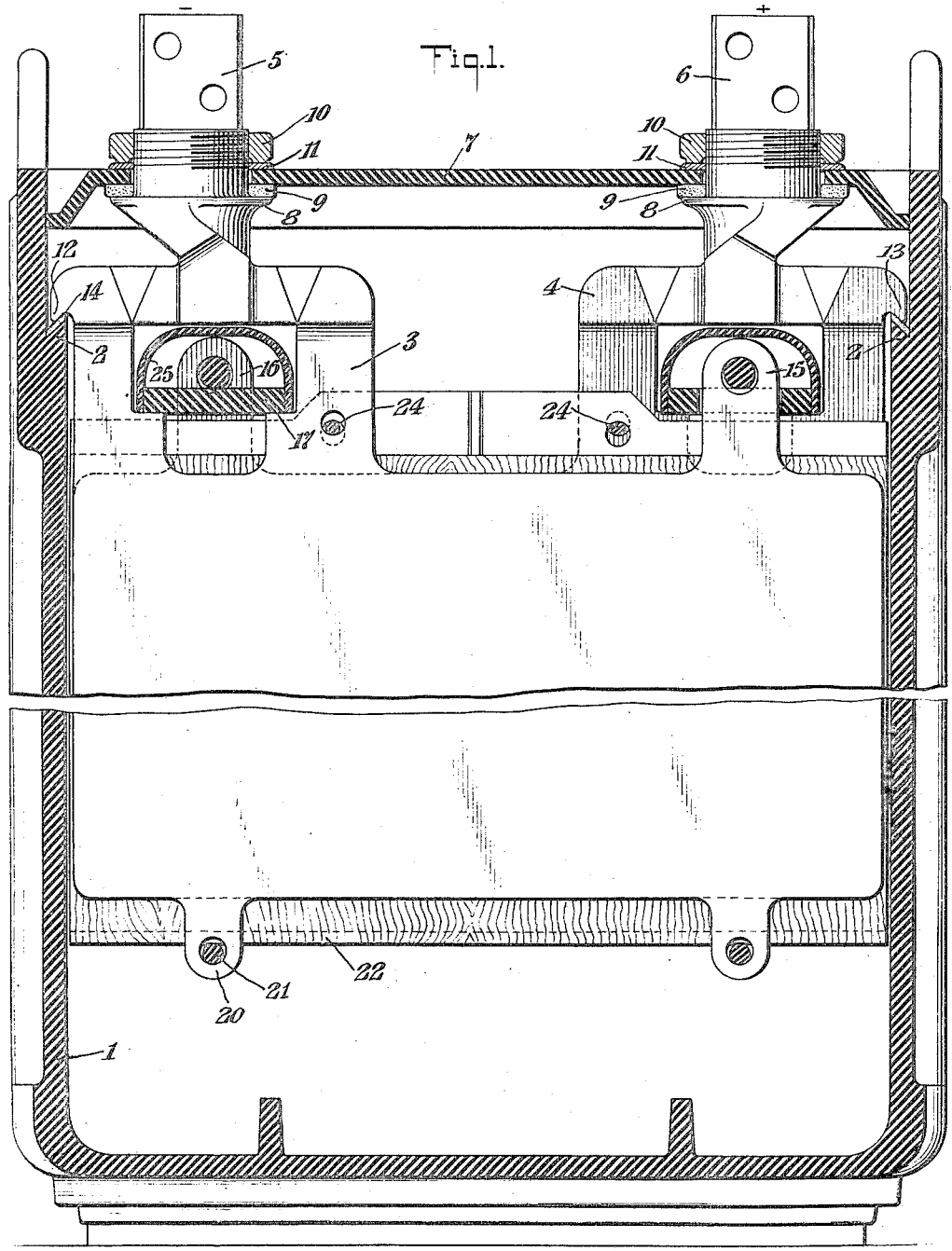

My invention will be better understood by reference to the annexed drawings forming a part hereof and in which Figure 1 shows a sectional elevation of a battery.

Figure 2:
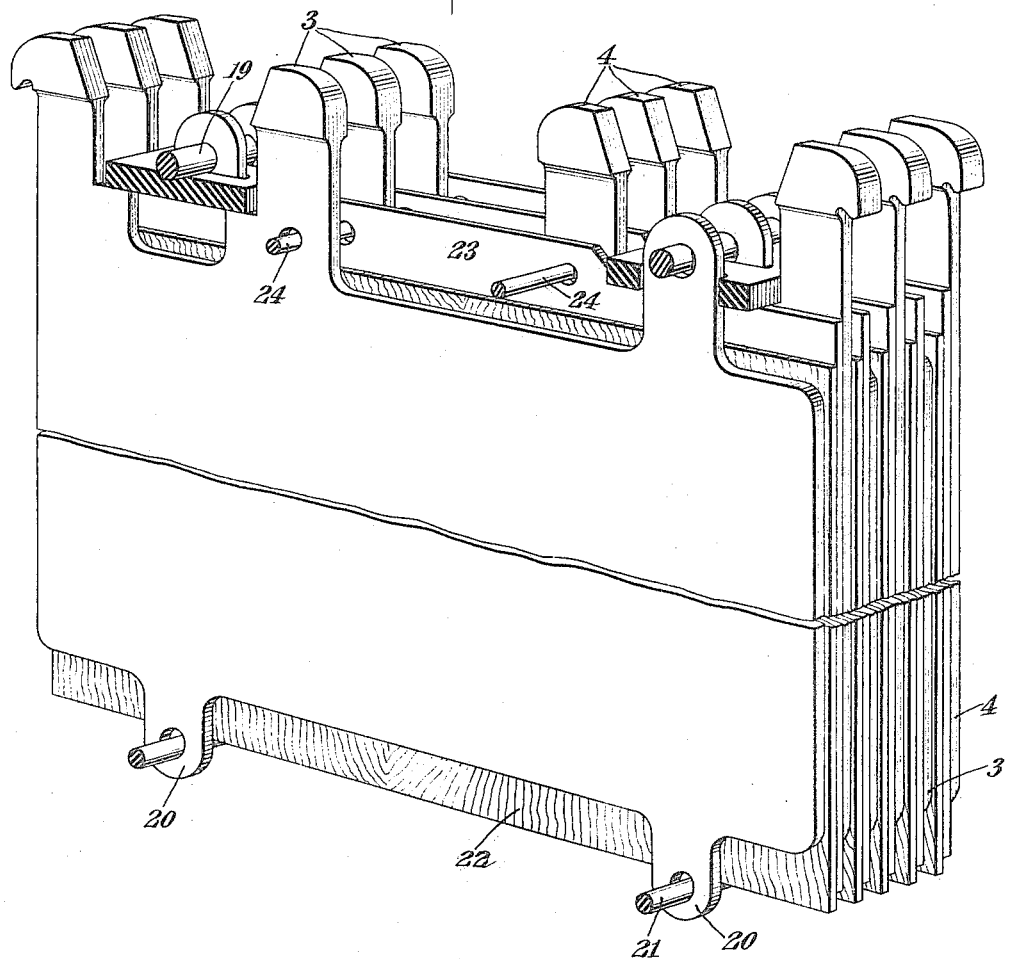
Figure 3:
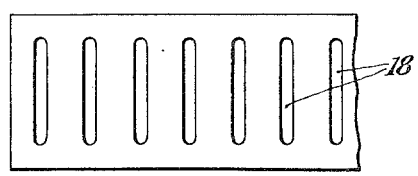

Fig. 2 shows in perspective the parts assembled and Fig. 3 shows a plan view of a portion of one of the supporting elements.

The battery consists of the usual jar 1, having an offset portion 2 on opposite sides thereof. Arranged in the container 1 are the plates 3 and 4, the plates 3 being of the same polarity and plates 4 being also of the same polarity but opposite to the plates 3. All of the plates 3 are connected with a terminal 5 and all of the plates 4 are connected with a terminal 6 in the usual manner. The terminals 5 and 6 extend through the cover 7, which is of insulating material, and the flanges 8 on the terminals 5 and 6 are held up against the washer 9 by means of a threaded nut 10 which also, when screwed down, binds on washer 11 securely between a nut and the flanges 8. By this arrangement the cover is securely fastened on to the terminals. Each of the plates 3 has a projection 12 which engages the offset portion 2 on one side of the jar and each of the plates 4 has a projection 13 which likewise engages the offset portion 2 on the opposite side of the jar. On both sides the projections 12 and 13 rest directly upon a member 14 of resilient insulating material, preferably soft rubber.

Each plate 3 is provided at its free end with a projection 15 and each of the plates 4 is provided at its free end with a projection 16. These projections 15 and 16 have holes therethrough. A member 17 of insulating material has a series of openings 18 therein which are of sufficient size to allow the projections 16 to pass upwardly therethrough a distance sufficient to permit a rod 19 or other member of insulating material to pass through the openings in the projections 16. The member 17 rests on top of the terminal ends of the plates 3 and when the rod 19 is in place the free ends of the plates 4 are also supported from the terminal ends of the plates 3.

An arrangement exactly similar to that above described is provided for supporting the free ends of the plates 3 from the terminal end of plates 4.

It is important that the projections 15 and 16, which are located underneath the terminals 6 and 5 respectively be protected against accumulation of sediment or other material which might cause short-circuit, the projections being of opposite polarity to the terminal in which they are placed. In order to avoid the possibility of short-circuit a member 25 is placed along the top of the projections 15 and 16 the same being placed in position by sliding it transversely of the plates to the position shown in Fig. 1. This member acts as a cover for the projections and eliminates the chance of collection of material which might cause a local leakage and eventually short-circuit.

The negative plates 3 are provided with downwardly extending projections 20, one on each end thereof. Through openings in these projections extend rods 21 which support the wood separators 22. The hard rubber separators 23 are supported by a rod 24 extending through openings in the members 23 and openings in the plates 3 and 4.

From the foregoing arrangement it will be evident that the free ends of the plates are rigidly supported from the terminal ends of the plates of opposite polarity and in such manner as to protect the plates against short-circuit.

Having described my invention, what I claim as new and desire to secure by Letters Patent is:

1. In a storage battery the combination of a jar containing positive and negative plates each having a terminal and a free end, the terminal and free ends of the positive and negative plates being grouped and connected together respectively at opposite sides of the jar, a projection from the free end of each plate extending upwardly and having an opening therein, the openings in the projections of plates of like polarity being alined, a member of insulating material having openings therein through which said lugs pass, said member resting on the terminal end of the plates of opposite polarity, a member of insulating material passing through the openings in said lugs above said other member and a cover of insulating material covering said lugs and said members.

2. A storage battery comprising a jar containing positive and negative plates each having a terminal and a free end, the terminal ends of the positive and negative plates being grouped and connected together respectively at opposite sides of the jar, a projection on the free end of each plate extending upwardly above the body of the plates, a supporting member resting on the terminal ends of one group of plates and having openings therein through which said projections pass, removable means anchoring said projections to said supporting member and a member of insulating material acting as a cover for said projections.

In testimony whereof I have signed my name to this specification.

ALMOND H. SNYDER.